A. E. ZOCK.
FLEXIBLE JOINT FOR SHAFTS.
APPLICATION FILED MAR. 31, 1910.
981,736.
Patented Jan. 17, 1911.
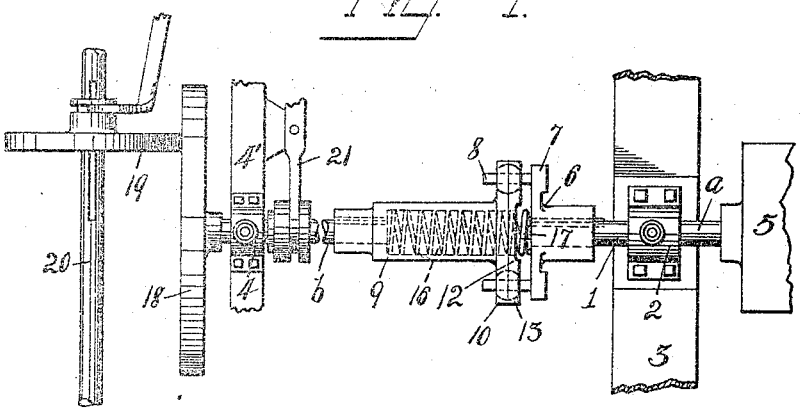
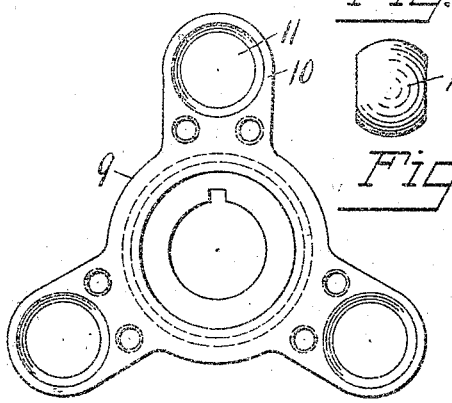
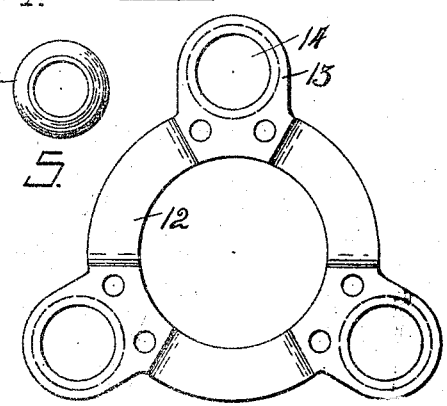
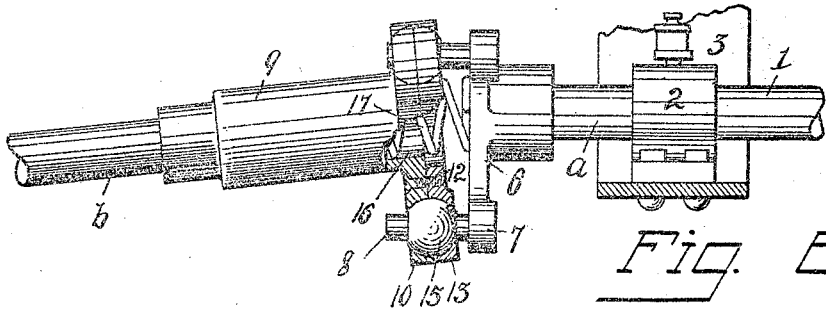
WITNESSES:
C. H. Bills.
E. E. Thomas.
INVENTOR.
August E. Zock,
By Owen & Owen
His attys.

UNITED STATES PATENT OFFICE.

AUGUST E. ZOCK, OF WATERVILLE, OHIO, ASSIGNOR TO THE WATERVILLE TRACTOR COMPANY, OF WATERVILLE, OHIO, A CORPORATION OF OHIO.

FLEXIBLE JOINT FOR SHAFTS.

981,736.   Specification of Letters Patent.   Patented Jan. 17, 1911.

Application filed March 31, 1910. Serial No. 552,683.

*To all whom it may concern:*

Be it known that I, AUGUST E. ZOCK, a citizen of the United States, and a resident of Waterville, in the county of Lucas and State of Ohio, have invented a certain new and useful Flexible Joint for Shafts; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to flexible or universal joints of the class adapted to connect the contiguous ends of shaft sections together for rotary movements in unison and to permit relative angular movements of such sections, but is not restricted to such use as it may be used in any connection for which it may be adapted or appropriate.

The object of my invention is the provision of an improved and highly efficient joint of the class described, which is simple, strong and durable in its construction, inexpensive of manufacture, and which is especially adapted for use in connection with the drive shafts of motor road vehicles in that it permits a free flexing of the shaft without affecting the driving efficiency thereof.

The invention is fully described in the following specification, and a preferred embodiment of the same illustrated in the accompanying drawings, in which,—

Figure 1 is a plan view of a drive or motor shaft of a vehicle with a portion of the associated parts and the joint comprising my invention associated therewith. Figs. 2, 3, 4 and 5 are enlarged views of different parts of the joint, and Fig. 6 is an enlarged view of a portion of a shaft having my joint associated therewith with the shaft sections relatively angled and the joint partly broken away.

Referring to the drawings, 1 designates the drive or motor shaft of a vehicle, which shaft is composed of the two sections $a$ and $b$, and is shown as having one journaled in a bearing 2 carried by a frame part 3 of the vehicle and the other journaled in a bearing 4 carried by a frame part 4' of the vehicle.

Mounted on the inner end of the section $a$, which, in the present instance, is the one attached to the motor 5 of the vehicle, is what may be termed, a spider 6. This spider has three arms 7 projecting radially from the end of its hub adjacent the inner shaft end, and projecting from the outer end portion of each of such arms in parallelism with the shaft section $a$ and in the direction of the other shaft section is a pin 8.

9 designates a prolonged hub or sleeve member, which has one end keyed to the inner end of the shaft section $b$ and its other end projected beyond the end of such section toward the adjacent end of the other section. The end of the member 9 adjacent the spider 6 is formed with a plurality of radial arms 10, in the present instance three in number, which are provided with openings 11 in register with the pins 8 of the spider 6. A plate 12 conforming in shape to the armed end of the member 9 is secured to such end of said member by screws, or in any suitable manner, and has its arms 13 provided with openings 14 in register with the openings 11 of the arms 10. The openings 11 and 14 have their inner ends semispherically enlarged to adapt them to combine to receive and retain ball-like members 15 therein for rotary or universal movements. Each of the ball-like members 15 has an axial opening therethrough to loosely receive a registering pin 8 to provide a universal bearing therefor, which permits a pin to have reciprocatory as well as oscillatory movements relative to the shaft section $b$.

The bore of the portion of the member 9 which projects beyond the end of the shaft section $b$ is preferably of greater diameter than the shaft, as indicated at 16, and carries a coiled compression spring 17. The inner end of this spring has its thrust against the inner end wall of the socket 16, while its outer end is normally projected beyond the free end of the member 9 and the attached plate 12 and has its thrust against the adjacent end of the spider 6 to act to retain the spider 6 and member 9 yieldingly spaced, as indicated.

The shaft section $b$ is shown, in the present instance, as carrying a friction disk 18 at its outer end with the face of which a driven disk 19 peripherally coacts. The disk 19 is shiftable on a shaft 20 toward or away from the axis of the disk 18 to vary the speed of driving of the disk 19. The shaft-section $b$ may be shifted against the action of the spring 17 to effect a release of the contact of the disks 18 and 19 by a movement of a control-lever 21.

It is apparent that by the use of the form of flexible joint shown and described, the ends of the shaft sections are yieldingly held apart to permit a free flexing of the shaft, and the working of the pins 8 through the balls 15 causes a positive rotation of the two sections in unison and at the same time permits the member 9 to oscillate relative to the pins 8 and attached shaft section due to the free turning of the balls 15 within such member. The spring 17 also acts, in the case of a friction-drive such as that shown, to maintain the coacting disks in frictional driving contact at whatever angle the shaft may be.

While I have illustrated my invention in connection with a particular form of driving mechanism, I wish it understood that the same is not restricted to use in any particular connection, and also that the invention is not limited to any specific arrangement or construction of the parts except in so far as such limitations are specified in the claims.

Having thus described my invention, what I claim as new and desire to secure by Letters Patent, is,—

1. A joint of the class described, comprising two axially spaced members, one of which has an axial socket in the inner end thereof, a compression spring mounted in said socket and having its outer end projecting therefrom and acting on the other member to yieldingly retain said members in spaced relation, universally movable parts carried by one of said members adjacent its inner end and having openings therein and parts projecting from the inner end of the other of said members in parallelism with its axis and working loosely in said universally movable parts.

2. A joint of the class described, comprising two axially spaced members having their inner ends provided with radially projecting portions and one having an axial socket in the inner end thereof, means carried by said socket and acting on said members to retain them yieldingly spaced, universally rotatable parts carried by the radially projecting portions of one of said members, and pins projecting from the radially projecting portions of the other of said members and coöperating with said parts to communicate rotation from one to the other of said members and to permit said members to have relative angular movements.

In testimony whereof, I have hereunto signed my name to this specification in the presence of two subscribing witnesses.

AUGUST E. ZOCK.

Witnesses:
E. E. THOMAS,
C. W. OWEN.